July 5, 1960 W. BROWN 2,944,153

ENERGY CALIBRATION SOURCE HOLDER

Filed April 4, 1955

INVENTOR.
WALTER BROWN.

BY [signature]

AGENT.

United States Patent Office 2,944,153

Patented July 5, 1960

2,944,153

ENERGY CALIBRATION SOURCE HOLDER

Walter Brown, White Plains, N.Y., assignor to North American Philips Company, Inc., Mount Vernon, N.Y.

Filed Apr. 4, 1955, Ser. No. 499,154

7 Claims. (Cl. 250—106)

This invention relates to improvements in devices for use in X-ray apparatus and more particularly to attachments which enable radiation detectors to be calibrated The conventional alignment of X-ray diffraction and spectographic systems requires the use of detector tubes. Before the detector tube can be used, however, it must be calibrated. Detector tubes of the proportional variety, i.e., proportional counters and scintillation counters require calibration with sources of not only known intensity but also known energy. The voltage output of these devices is proportional to the energy of incident X-rays absorbed by them. Consequently, the use of a radioactive source emitting discrete energy provides a convenient means for calbrating the radiation detector. The output voltage pulses of the detector are proportional to the energy being absorbed in the detecting device and may be varied by changing the operating voltage of the detecting device. In addition, the recording of these pulses requires amplification by means of associated amplifying circuitry. The gain of this amplifying circuitry must be determined so that precise information may be obtained in the use of this X-ray apparatus. Accordingly, it is an object of this invention to provide a device for use in X-ray apparatus which emits X-rays of known energy and intensity whereby the apparatus may be calibrated.

The use of the foregoing equipment for obtaining exact information by measuring and recording line intensities in X-ray diffraction patterns requires very accurate positioning of an X-ray source, a sample to be irradiated, and a radiation detector with respect to one another. Accordingly, it is an additional object of this invention to provide an improved X-ray apparatus whereby a radiation detector may be calibrated without disturbing the relative positioning and alignment of the X-ray source, specimen holder or radiation detector.

A further object is to provide an X-ray apparatus having a predetermined X-ray path between a sample and radiation detector including replaceable calibration means which emits X-rays along said path into the detector.

Another object is to provide a constant energy X-ray source offering greater stability than conventional use of an electronic X-ray tube.

The above and other features, objects and advantages of the present invention will be fully understood from the following description considered in connection with the accompanying illustrative drawings.

Figure 1:
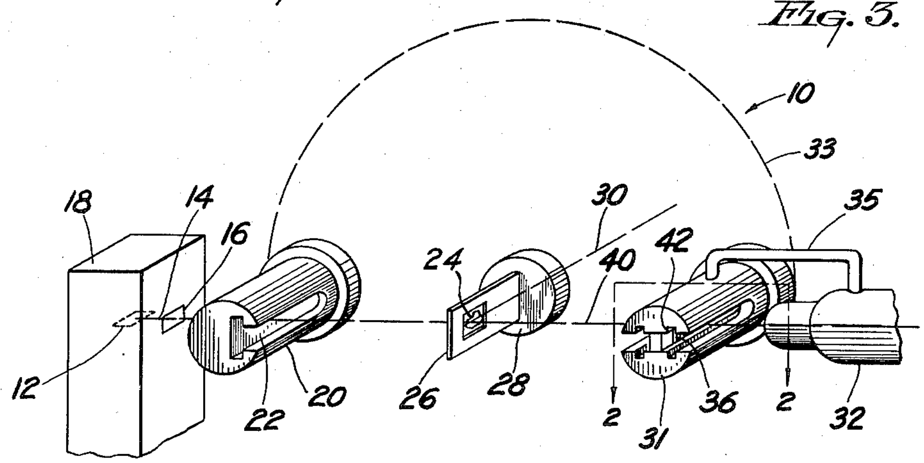
Fig. 1 is a diagrammatic representation of one embodiment of the X-ray apparatus according to the invention.

Referring to the drawing, Fig. 1 shows an X-ray apparatus referred to generally by the numeral 10 having a source 12 such as an X-ray tube issuing X-rays 14 through a window 16 of housing 18. Collimator 20 is positioned adjacent window 16 and serves to transmit X-rays which are parallel with the plane of foils 22 and to suppress the transmission of rays entering angularly thereto.

The X-rays transmitted through collimator 20 then impinge upon specimen 24 contained in mounting plate 26 which is secured to specimen holder 28. Specimen holder 28 is preferably rotated by gears (not shown) about an axis 30 passing through the surface of the specimen. Some of the X-rays then diffract from the surface of the specimen 24.

A receiving collimator 31 and detector 32 are both mounted on apparatus 10 for rotation along path 33 and both are supported by arm 35 so that the diffracted X-rays pass through collimator 31 and into detector 32. The collimator 31 is preferably proximately positioned with regard to detector 32 in order that air absorption of the X-rays may be reduced.

Figure 2:
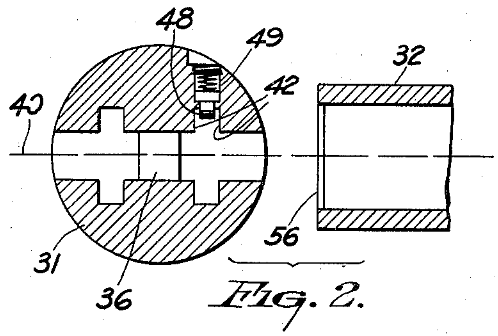
Fig. 2 is a sectional view of the detail of Fig. 1 along lines 2—2.
Figure 3:
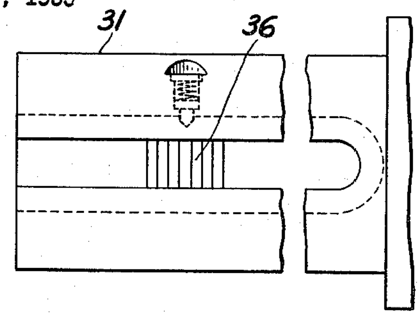
Fig. 3 is a sectional view of a collimator support.
Figure 4:
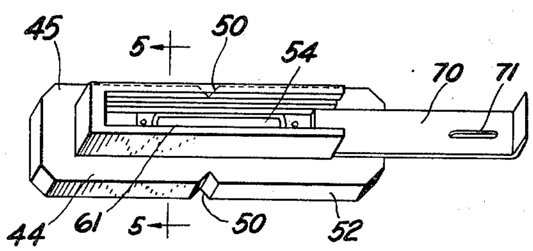
Fig. 4 is a perspective view of a source holder.
Figure 5:
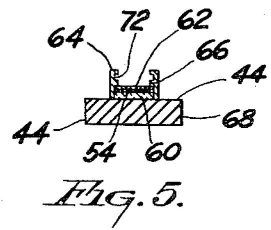
Fig. 5 is a sectional view of the present source holder on lines 5—5 of Fig. 4.

The diffracted X-rays from the specimen are transmitted through the collimator 31 substantially parallel to the plane of parallel foils 36 mounted therein. Collimator 31 is additionally provided with reference surfaces 42 which are precisely ground and in the preferred embodiment shown in Fig. 2 are at right angles to the axis of X-ray path 40. These surfaces serve as position reference surfaces for a holder 45 (see Fig. 4) containing a calibrating source of X-radiation to be described later in greater detail. For precisely positioning the holder 45 in the collimator 31, the collimator is additionally provided with indexing means 48 which engage indentations 50 on the sides 52 of the holder. By this positioning and alignment, X-rays issuing from source 54 are directed through window 56 of a radiation detector, which may be a device such as a proportional counter, Geiger counter, scintillation counter or camera. The counter 32 and associated measuring equipment may be then calibrated by positioning a holder 45 having an X-ray source of known intensity and energy in the collimator.

In order to obtain reproducible results, source 54 must be positionable in a predetermined location with respect to radiation detector 32. For this purpose, the holder 45 is provided with reference surfaces 44 which are accurately machined and which engage reference surfaces 42 of collimator 31.

The holder 45 may be provided with a cover 70 of a suitable material over radioactive source 54 such that the X-rays from the source will cause the material of the cover to fluoresce. Since each element of the periodic table emits characteristic fluorescent energy the material of the cover will be selected so that the energy from the X-ray source will be reduced by a desired amount and the intensity of the X-rays will be attenuated by a desired amount. Accordingly, the linearity of the X-ray equipment can be checked by using a radioactive source issuing X-rays of known energy and intensity which can be varied a known amount.

In the embodiment of the source holder shown in the drawing the radioactive source 54 consists of an iron 55 isotrope in any stable form, preferably in an oxidic form. The X-ray energy emitted therefrom is 6 kev. The oxide was distributed evenly on flat glass mounting plate 60. An X-ray transparent layer 62 was placed over source 54. Mounting plate 60 and layer 62 with radioactive source 54 between them were then placed in the central aperture 61 of retaining piece 64 which has ridges 66 therein to engage the edge of layer 62 when mounted on base plate 68.

The radioactive material used as the source can be other radioactive isotopes which give off X-ray energy therefrom such as zinc 65 and tin 113 which emit 8 and 24 kev. X-ray energy respectively. The foregoing materials emitting discrete energies may be conveniently used with proportional detecting devices; however, gamma sources may also be used in this holder. In addition, the source may exist in any physical form as long as it is accurately positionable with respect to an X-ray apparatus. Layer 62 in the embodiment shown was .001 inch thick and made of "mylar," a trade name for a plastic consisting principally of a polyester layer which is a reaction product of ethylene glycol and terephthalic acid. Materials such as beryllium, mica and other X-ray transparent materials may also be successfully employed. Base plate 68, retaining piece 64 and cover 70 were made of brass about ⅜ inch thick. The thickness of the metals constituting the base plate, retaining piece and cover may be made of other metals in desired thickness to prevent the transmission of X-rays therethrough. When the source is not being used it may be enclosed by sliding cover 70 in the grooves 72 provided in retaining piece 64. A slit or other opening 71 may be provided in cover 70 to alter the form of the X-ray beam emanating therefrom. Examples of some materials of which cover 70 may be made for the purpose of fluorescing would be titanium chromium and vanadium of optimum thickness so that the fluorescent radiating energy would not be self absorbed.

An advantage of using low energy radioactive sources such as Fe55 is that they can be placed in a holder which can be handled manually without requiring special precautions to protect the health of a user thereof.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What I claim is:

1. An X-ray apparatus comprising an X-ray source, a sample to be irradiated held in a predetermined position to said source, a first support member, a radiation detector mounted on said first support member in a predetermined position with respect to said sample and source, a collimator support member mounted on said first support member in a predetermined position with respect to said detection means, the X-rays emanating from said X-ray source having a given axis forming a path between said sample and said detection means, said collimator support member having a first precise reference mounting surface and a second precise reference mounting surface, a calibration source for said detector removably supported in said collimator support member, said source comprising a source holder member slidable in said collimator support member having a first precise reference surface slidable into abutting relationship with said first precise reference surface of said collimator support and a second precise reference surface slidable into abutting relationship with said second precise reference surface of said collimator support, a radiating source constituted of radioactive isotopes emitting X-rays of predetermined energy positioned in fixed relationship to said first and second precise reference surfaces of said source holder and thereby being adapted to emit radiation into the detector along said given X-ray path axis.

2. An X-ray apparatus comprising an X-ray source, a sample to be irradiated held in predetermined position to said source, a first support member, a radiation detector mounted on said first support member in predetermined position with respect to sample and source, a collimator support member mounted on said first support member in a predetermined position adjacent said detection means, the X-rays emanating from said X-ray source having a given axis and forming a path between said sample and said detection means, said collimator support member having a precise reference mounting surface, a plurality of spring-urged projections on said collimator support, a calibration source for said detector removably supported in said collimator support member, said source comprising a source holder member having at least one precise reference surface abutting said precise reference surface of said collimator support member and indentation means therein whereby in operative position of said calibration source said projections are retained in said indentation means, a radiation source constituted of radioactive isotopes emitting X-rays of predetermined energy positioned in fixed relationship to the precise reference surface of said source holder and thereby being adapted to emit radiation into the detector along said given X-ray path axis, and a replaceable cover slidably mounted on said source holder for changing the energy transmitted from said holder.

3. An X-ray apparatus as claimed in claim 2 in which the reference surface of said collimator is positioned transverse to the X-ray path between the sample and the detector, the reference surface of the source holder being in abutting relationship with the adjacent reference surface of said collimator, and the radioactive source being positioned in fixed alignment parallel to the reference surfaces of said collimator support member and the reference surface of said holder.

4. A radioactive source holder comprising a base member having at least one reference surface and indexing means thereon, a base plate, a retaining piece having a central aperture therein mounted on said plate, a retaining ridge in said retaining piece and defining said aperture, said retaining ridge being spaced from said base member, a radioactive X-ray source deposited on the surface of the base plate bounded by the aperture of said retaining piece, an X-ray transparent layer mounted by said retaining ridge and covering said source.

5. A radioactive source holder comprising a base member having at least one reference surface and a plurality of indentations in certain positions thereon, a retaining piece having a central aperture therein mounted on said plate, a retaining ridge on said retaining piece defining said aperture and spaced from said base member, a mounting plate positioned in said aperture, an X-ray transparent layer mounted by said retaining ridge, a radioactive source positioned between said mounting plate and said layer, said radioactive source being in fixed relationship to said reference surface by engagement of said retaining ridge against the peripheral edge of said layer.

6. A radioactive source holder comprising a base member, at least one reference surface and indexing means in a predetermined position thereon, a retaining piece having a central aperture therein mounted on said plate, a retaining ridge on said retaining piece defining said aperture and spaced from said base member, a mounting plate positioned in said aperture, an X-ray transparent polyester film on said mounting plate, a radioactive source constituted by Fe55 positioned between said mounting plate and said layer, said radioactive source being positioned in fixed relationship to said reference surface and indexing means by engagement of the peripheral edge of said film by said retaining ridge.

7. A radioactive source holder as claimed in claim 6 in which said retaining piece has grooves bounding said aperture and positioned on the side of said film remote from said base member, and a replaceable cover slidably mounted in said grooves for changing the energy transmitted from said holder.

References Cited in the file of this patent

UNITED STATES PATENTS

| | | |
|---|---|---|
| 2,479,882 | Wallhausen et al. | Aug. 23, 1949 |
| 2,575,134 | Schultz et al. | Nov. 13, 1951 |
| 2,593,526 | Bell | Apr. 22, 1952 |
| 2,666,857 | McLaren et al. | Jan. 19, 1954 |
| 2,675,479 | Stewart et al. | Apr. 13, 1954 |
| 2,709,752 | Parrish et al. | May 31, 1955 |